T. H. MONAGHAN.
DISHWASHER.
APPLICATION FILED OCT. 25, 1920.
1,399,978.
Patented Dec. 13, 1921.
2 SHEETS—SHEET 1.
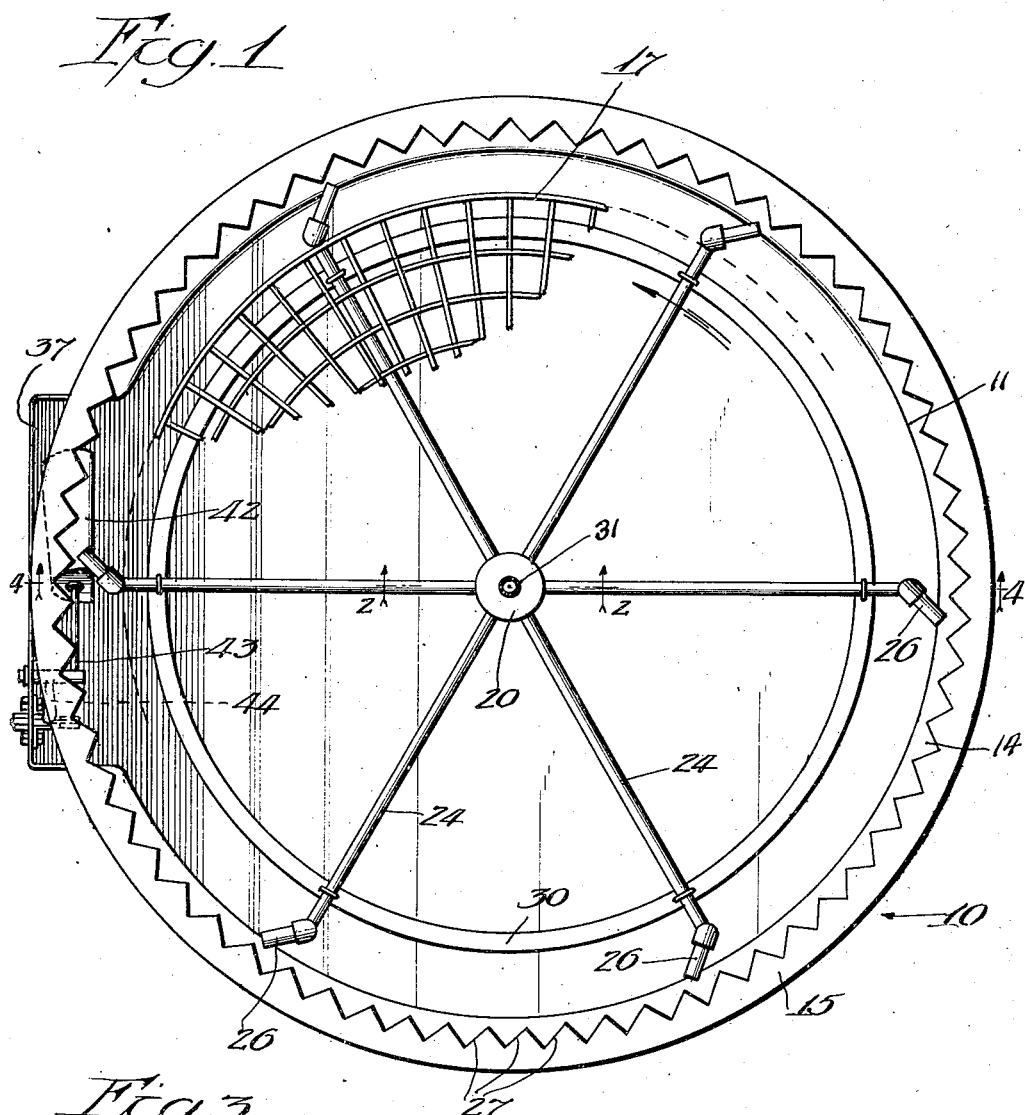
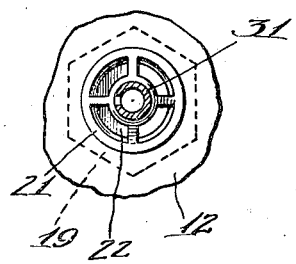
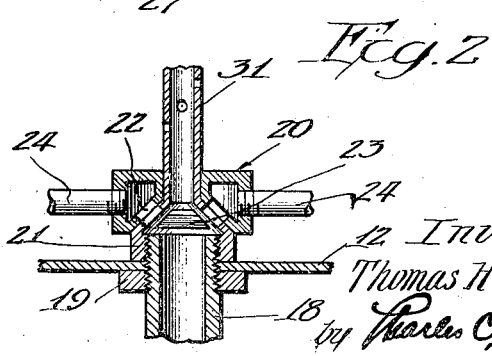
Inventor:
Thomas H. Monaghan,
by Charles O. Shewey
his Atty.

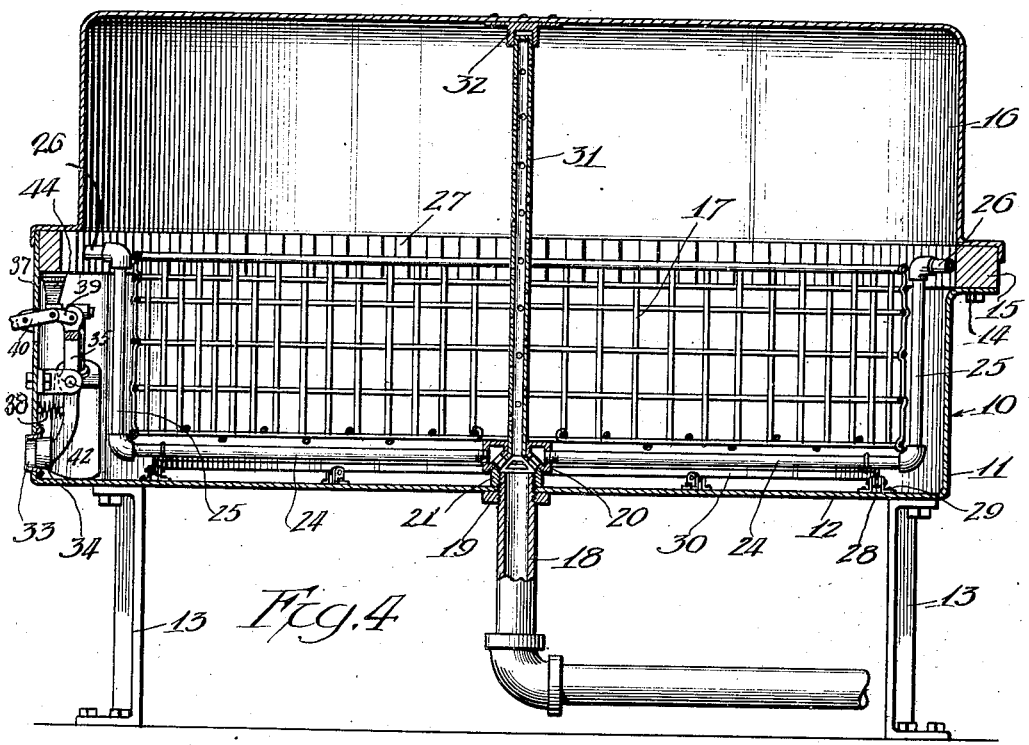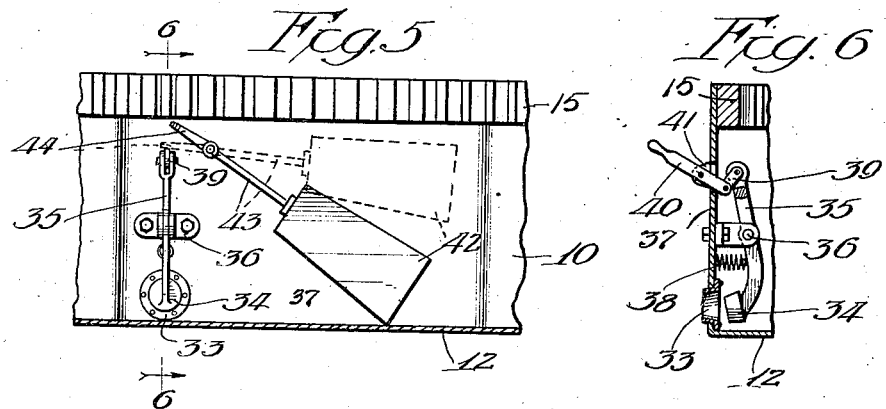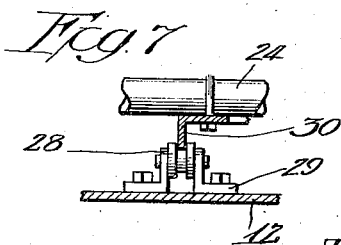

UNITED STATES PATENT OFFICE.

THOMAS H. MONAGHAN, OF CHICAGO, ILLINOIS.

DISHWASHER.

1,399,978.  Specification of Letters Patent.  Patented Dec. 13, 1921.

Application filed October 25, 1920. Serial No. 419,375.

*To all whom it may concern:*

Be it known that I, THOMAS H. MONAGHAN, a citizen of the United States, and a resident of Chicago, Cook county, and State of Illinois, have invented certain new and useful Improvements in Dishwashers, of which the following is declared to be a full, clear, and exact description.

This invention relates to dishwashers and among its objects are to make use of the wash water to rotate the dish tray or basket in which the dishes are held so as to expose the several sides of the dishes to the sprays occasioned by the water in rotating the tray or basket. Another object is to provide automatic means, governed by the rise of water in the casing, for opening a discharge opening or outlet for the exit of dirty water after it has risen to a predetermined level in the casing. Another object is to increase the efficiency of dishwashers, simplify and otherwise improve thereon. With these and other objects in view, this invention consists in the several novel features of construction, arrangement and combination of parts hereinafter fully set forth and more particularly defined in the claims.

The invention is clearly illustrated in the accompanying drawings, in which Figure 1 is a plan of a dishwasher embodying a simple form of the present invention, the cover being removed and a portion of the dish tray or basket broken away; Fig. 2 is a detail, vertical section taken on the line 2—2 of Fig. 1; Fig. 3 is a plan of the parts seen in Fig. 2, the upright sprayer pipe being shown in cross section; Fig. 4 is a vertical, central section, taken on the line 4—4 of Fig. 1; Fig. 5 is a side elevation of certain valve actuating mechanism, the bottom of the casing being shown in cross section; Fig. 6 is a vertical, cross section taken on the line 6—6 of Fig. 5; and Fig. 7 is a detail view, partly in side elevation, partly in vertical section, of a fragment of the sprayer pipe and one of the roller bearing supports therefor.

Referring to said drawings, the reference character 10 designates a pan or casing, open at the top, and preferably having an annular wall 11 and a flat bottom 12. Secured to said casing are supporting legs 13 which may be provided for supporting the casing at a convenient height above the floor. The upper edge of the wall 11 of the casing may be flanged outward to provide a rim or flange 14 to stiffen its upper edge, and said rim may be further reinforced by a ring 15 secured to it by rivets, screws or the like. A cover 16 rests upon the ring 15 and closes the open top of the casing.

Supported in said casing is a removable dish tray or basket 17 which is employed to receive and hold the dishes during the washing operation, and said tray may be constructed of wire mesh work as is well understood. It has an annular upright wall of less diameter than that of the casing and a flat bottom which may rest upon the sprayer pipes as will presently appear.

A water supply pipe 18 enters through the bottom 12 and is provided with a packing joint 19 to guard against leakage at the place where it passes through the bottom 12. Above the bottom is a hollow rotatory head 20, which rests on a hollow stationary fitting 21, that is secured on the upper end of the supply pipe 18 and forms a bearing for the head 20 to rotate upon. Preferably the upper face of the fitting 21 is made of tapered or conical formation, and the lower face of the head 20 is correspondingly countersunk to form a bearing surface resting upon the tapered face of the fitting 21. Registering openings 22, 23, are formed in the contacting tapered walls of the head 20 and fitting 21 respectively, for the passage of water from the supply pipe to the rotatory sprayer pipes, as will presently appear.

The rotatory sprayer pipes 24 are preferably arranged radially of the casing and are secured in the rotatory head 20. They extend to within a short distance from the annular wall 11 of the casing and have upright portions 25 that terminate at their upper ends in horizontally extending nozzles 26, which are directed in a generally tangential direction toward the ring 15. The nozzles 26 may comprise short length nipples, connected to the upright part 25 of the sprayer pipes 24 by elbows, although this particular construction is not material, broadly considered. The inner face of the ring 15 is corrugated or serrated as shown at 27, thereby forming ridges or shoulders, to receive the impact from the streams of water, issuing from the nozzles, and to break up the streams of water into sprays which are dashed or thrown back on the dishes contained in the tray or basket. The dish tray rests on the radial sprayer pipes 24, and roller supports are provided to carry the weight of the pipes, tray and dishes. Said roller supports may comprise rollers 28 carried by brackets 29, which are secured to the casing and an endless rail 30 secured to the under side of the sprayer pipes 24 and resting on the rollers 28.

To increase the efficiency of the washer a centrally located stationary sprayer pipe 31 may be employed. Said pipe is perforated along its length and extends up from the fitting 21 to the cover 16 where its upper end is seated in a bearing bracket 32 secured to the underside of the cover 16. The upper end of the stationary sprayer pipe 31 may be closed by a plug or other stopper as desired.

According to one phase of the invention, hot water is admitted through the supply and sprayer pipes until the casing is partly filled with water, and the dishes are moved around in the hot water until it reaches a predetermined level, whereupon a discharge outlet is opened automatically, and the dirty water permitted to escape, after which the dishes are rinsed by the clear water issuing from the sprayer pipes. The means for operating the automatic discharge will now be described.

At one side of the casing, adjacent its bottom, is a discharge opening 33, which is controlled by a valve 34, here shown in the form of a tapered plug which enters the discharge opening 33. The valve is automatically opened by means actuated by the rise of water in the casing to a predetermined level, to permit the discharge of accumulated water from the casing, and said valve may be closed manually for a subsequent operation. In the simple form shown, the valve is carried by a lever 35 pivotally supported upon a bracket 36 which is secured to the upright wall of the casing, and as a preference said upright wall at this place may be offset outwardly as at 37 to receive the valve operating mechanism. The valve lever 35 is spring pressed by a spring 38 in a direction to unseat the valve and thus uncover the discharge opening or outlet 33 and the upper end of said valve lever 35 is connected to one end of a link 39, the other end of which is connected to a setting lever 40 pivoted upon a bracket 41 secured to the wall 37. The lever 40 extends out through a slot in said wall 37 in convenient position to be manipulated. The link and lever connections 39, 40, with the valve lever, provide means whereby the valve may be closed manually by pressing down on the setting lever 40 until the pivotal connection between said setting lever 40 and link 39 passes a straight line connecting the fulcrum of the setting lever with the pivotal connection between the link 39 and valve lever 35. As soon as the pivotal connection between the setting lever and link presses the dead center, the spring 38 acts to hold the parts in this position with the valve closed. The parts are prevented from movement appreciably beyond the dead center by the upper end of the slot through which the setting lever extends. A float 42, carried by an arm 43 pivoted upon a bracket which is supported by the wall 37 operates to swing said arm 43 upon its fulcrum, when the float is lifted by the rise of water in the casing, and the free end 44 of said arm is arranged to strike the joint between the setting lever and link when the float is lifted to a predetermined height, and thereby break the joint—that is, said free end 44 of the float arm 43 moves the jointed ends of the setting lever and link down past the dead center, whereupon the spring 38, moves the valve lever, withdrawing the valve from the discharge opening, and permitting the accumulated water to escape. The float returns to its normal position, but the discharge opening remains uncovered until it is closed by an attendant pressing down on the setting lever 40.

In the operation of the device, the cover 16 is removed, the dishes are stacked indiscriminately in the tray or basket 17 and a soapy solution or compound is poured or sprinkled upon the dishes or into the casing. The cover is then replaced and the hot water turned on to the supply pipe. The valve 34 should be closed at the commencement of the operation.

Hot water is discharged from the stationary sprayer pipe 31 against the dishes, and the streams of water issuing from the nozzles 26 impinge upon the corrugations or serrations of the ring 15, and are broken up into sprays which are thrown or dashed back against the dishes. The back pressure of the water, causes the sprayer pipes and therewith the tray and dishes to be rotated about the axis of the supply pipe, and as the hot soapy water rises in the casing, the dishes are drawn through the soapy water until it reaches a predetermined level, at which time the float will have been raised sufficiently to break the joint between the setting lever 40 and link 39, thus permitting the spring 38 to unseat the valve 34 and allowing the soapy water to escape through the discharge opening. The hot water is left turned on until the dishes are thoroughly rinsed, then turned off. The cover is removed, and the dishes removed from the tray, or the tray may be removed from the casing with the dishes contained in it.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new and desire to secure by Letters Patent:

1. A dishwasher comprising a casing having an annular corrugated member, a dish tray in said casing, a water supply pipe, a rotary water sprayer element communicating therewith and having nozzles for directing streams of water against said corrugated member, whereby said water sprayer element is rotated and the water jets are thrown back on the dishes in the tray.

2. A dishwasher comprising a casing having an annular corrugated member, a dish tray, a water supply pipe, a rotatory, combined dish tray support and water sprayer element communicating therewith and having nozzles for directing streams of water against said corrugated member, whereby the dish tray and combined dish tray support and water sprayer element is rotated and the water jets are thrown back on dishes in the tray.

3. A dishwasher comprising a casing having an annular corrugated member, a dish tray, a water supply pipe, a rotatory combined dish tray support and water sprayer element communicating therewith and having upwardly projecting end portions extending up along the sides of said dish tray and terminating in nozzles for directing streams of water against said corrugated member, whereby the dish tray and combined dish tray support and water sprayer element is rotated and the water jets are thrown back on dishes in the tray.

4. A dishwasher comprising a casing having an annular corrugated portion, a centrally located water supply pipe, a hollow head rotatively mounted on said pipe and in communication therewith, sprayer pipes extending from said head and having nozzles upon their ends directed toward said corrugated part of the casing, and a dish tray supported by said sprayer pipes, said corrugated part of the casing being arranged to break up the streams of water issuing from said nozzles and to throw the spray upon the dishes.

5. A dishwasher comprising a casing having an annular corrugated part, a water supply pipe, a rotatory water sprayer element in communication with said supply pipe and rotatively mounted thereon, said water sprayer element having nozzles for directing streams of water against said corrugated part of the casing to effect rotation of said water sprayer element, the corrugated part acting also to break up the streams of water into sprays directed against the dishes, and a dish tray supported by said water spraying element.

6. A dishwasher comprising a casing having an annular corrugated member, a water supply pipe, a series of radially extending, tray supporting water sprayer pipes, a hollow head connecting said pipes and rotatively mounted on said water supply pipe and in communication therewith, an annular rail secured to said water sprayer pipe, anti-friction bearings supporting said rail, and a dish tray supported by said water sprayer pipes, the latter being provided with nozzles upon their ends for directing streams of water against said corrugated portion, whereby the water sprayer pipes are rotated and water is dashed back upon the dishes.

7. A dish washer comprising a cylindrical casing having a discharge opening, a water supply pipe, a rotary water sprayer element having nozzles directed toward said casing, a dish tray supported by said rotary water sprayer element adjacent the bottom of the casing, a valve for controlling said discharge opening, and means controlled by the rise of water in said casing for opening said valve to permit of the escape of accumulated water while said dish tray is being rotated.

8. A dish washer comprising a cylindrical casing having an annular corrugated portion and having a discharge opening adjacent its bottom, a water supply pipe, a rotary dish supporting element in said casing adjacent its bottom, means coöperating with said corrugated portion for rotating said dish supporting element, a valve for closing said discharge opening, and means controlled by the rise of water in said casing for opening said valve to permit of the escape of accumulated water while said dish rotating element is in motion.

9. A dish washer comprising a cylindrical casing having a discharge opening adjacent its bottom, a water supply pipe, a rotary dish supporting element in said casing adjacent its bottom, means for rotating said dish supporting element, a valve for controlling said discharge opening, manually operated means for closing said valve, and means operated by the rise of water in said casing for automatically opening said valve to permit of the escape of accumulated water while the dish supporting element is in motion.

10. A dish washer comprising a cylindrical casing having a discharge opening adjacent its bottom, a water supply pipe, a rotary dish supporting element in said casing adjacent its bottom, means for rotating said dish supporting element, a valve for controlling said discharge opening, a float in said casing and means operated by said float for automatically opening said valve when the water in the casing reaches a predetermined level to permit the accumulated water to escape while the dish supporting element is in motion.

11. A dish washer comprising a cylindrical casing having a discharge opening adjacent its bottom, a water supply pipe, a rotary dish supporting element in said casing adjacent its bottom, means for rotating said dish supporting element, a valve for controlling said discharge opening, manually operated valve closing means, and float operated means for actuating said valve closing means to open the valve when the water in the casing reaches a predetermined level, to permit the accumulated water to escape while the dish supporting element is in motion.

12. A dishwasher comprising a cylindrical casing, a water supply pipe, radially disposed water sprayer pipes having nozzles directed toward said casing, a head, to which said pipes are secured, rotatively mounted on said water supply pipe, a dish tray supported by said sprayer pipes, and an upright, stationary, water sprayer pipe extending up from said supply pipe.

THOMAS H. MONAGHAN.